United States Patent
Tsao et al.

(10) Patent No.: US 8,732,273 B2
(45) Date of Patent: May 20, 2014

(54) DATA INQUIRY SYSTEM AND METHOD FOR THREE-DIMENSIONAL LOCATION-BASED IMAGE, VIDEO, AND INFORMATION

(75) Inventors: Shiao-Li Tsao, Taipei (TW); Cheng-Lung Lin, Nantou County (TW); Kaun-Ju Lin, Changhua County (TW); Hsin-Chung Chen, Banciao (TW)

(73) Assignee: National Chiao Tung University, Hsinchu (TW)

( * ) Notice: Subject to any disclaimer, the term of this patent is extended or adjusted under 35 U.S.C. 154(b) by 1033 days.

(21) Appl. No.: 12/416,237

(22) Filed: Apr. 1, 2009

(65) Prior Publication Data
US 2009/0254528 A1    Oct. 8, 2009

(30) Foreign Application Priority Data

Apr. 2, 2008   (TW) .............................. 97112055 A

(51) Int. Cl.
*G06F 15/16*    (2006.01)
(52) U.S. Cl.
USPC ............. 709/219; 348/61; 348/218; 348/159; 348/373; 348/212; 701/300; 701/213; 707/3; 707/10
(58) Field of Classification Search
USPC ......... 709/219; 348/61, 218, 159, 373, 212.2; 701/300, 213; 707/3, 10
See application file for complete search history.

(56) References Cited

U.S. PATENT DOCUMENTS

| | | | |
|---|---|---|---|
| 7,126,630 | B1 | 10/2006 | Lee et al. |
| 7,146,179 | B2 | 12/2006 | Parulski et al. |
| 2002/0154294 | A1* | 10/2002 | Hedges et al. ............. 356/141.4 |
| 2003/0060212 | A1* | 3/2003 | Thomas ....................... 455/456 |
| 2005/0073443 | A1* | 4/2005 | Sheha et al. ............... 340/995.1 |
| 2005/0108646 | A1* | 5/2005 | Willins et al. ................. 715/723 |
| 2006/0055584 | A1* | 3/2006 | Waite et al. ..................... 342/22 |
| 2007/0286023 | A1* | 12/2007 | Bull et al. ....................... 367/59 |
| 2008/0143482 | A1* | 6/2008 | Shoarinejad et al. ........ 340/10.1 |
| 2009/0096875 | A1* | 4/2009 | Yoshimaru et al. ........ 348/207.1 |

* cited by examiner

*Primary Examiner* — Thuong Nguyen
(74) *Attorney, Agent, or Firm* — WPAT, P.C.; Anthony King; Kay Yang

(57) ABSTRACT

This invention discloses a data inquiry system for three-dimensional location-based image, video, and information, which comprises a client device and a remote server. The client device provides space parameters and lens parameters to the remote server through a transmission module. The remote server determines a space inquiry range by the space parameter and lens parameter, inquires an object data of an object space position parameter at the space inquiry range, shows the object data in an image data displayed by the client device to facilitate users to identify the desired viewing object, and further inquires the object data and related image and/or video data.

24 Claims, 5 Drawing Sheets

DATA INQUIRY SYSTEM AND METHOD FOR THREE-DIMENSIONAL LOCATION-BASED IMAGE, VIDEO, AND INFORMATION

BACKGROUND OF THE INVENTION

1. Field of the Invention

The present invention relates to a data inquiry system for three-dimensional (3D) location-based image, video, and information, and the inquiry method thereof, and more particularly to a data inquiry system, a data inquiry method for 3D location-based image, video, and information using space parameters and lens parameters to determine space coordinates of objects.

2. Description of the Related Art

At present, people can use a mobile phone with a global positioning system (GPS) sensor to locate themselves and further retrieve the knowledge and information of a geographic site in which they are visiting. In the existing prior art, a user can use a handheld device with a camera to take a picture on a object they feel interested and then the handheld device can utilize the image recognition technologies for detecting the object in the photo. For example, if tourists want to learn more about Eiffel Tower in France during their visits, the tourists simply need to use a mobile phone to take the picture of the Eiffel Tower, and an image recognition program installed in the mobile phone detects the tower and retrieves related information of the Eiffel Tower from a database via the Internet and shows related information to users. However, it is a challenging job to detect various different kinds of objects on earth with 100% accuracy. In addition to the image recognition, other known prior art uses latitude and longitude data of a GPS sensor installed on a mobile device to show the geographic location of the device as the location of the user, and roughly describes the information about the neighborhood of a scenic spot. However, the location of such mobile device cannot describe the user's interested object or photo taken for the object precisely, and thus cannot obtain the actual information related to the object. For example, a tourist visiting a park sees mountains around the park and wants to learn about a particular mountain, while taking a photo of or searching the mountain by a mobile phone, the GPS installed in the mobile phone cannot locate the position of the mountain accurately, and thus cannot provide the related knowledge and information of the mountain.

In view of the aforementioned issue of an image data inquiry system, some patented technologies are used in a mobile device such as a digital camera and a global positioning system (GPS) receiver as disclosed in U.S. Pat. No. 7,146,179 entitled "Portable imaging device employing geographic information to facilitate image access and viewing". This method can obtain related information of the location of a photographer or an object, but cannot confirm the related information about the direction or the position of the photographed object.

In another solution to the aforementioned problem, a plurality of more complicated and larger stacked camera modules are used, such that the exposure value of each different camera can be used for obtaining the direction and the height of an image of a photo taken. With the data of the direction and the height of the image, the relation of the spatial image of the object can be computed in a way as disclosed in U.S. Pat. No. 7,126,630 entitled "Method and apparatus for omni-directional image and 3-dimensional data acquisition with data annotation and dynamic range extension method". However, this method incurs higher cost with complexity for a client device and such device cannot be carried easily.

Since the photo or video information recorded by the traditional methods actually shows the location of the photographer (or the camera equipment), but not the location of the photo itself, therefore users cannot obtain the desired information about the observed object through the GPS recording and service of a traditional way of taking a photo, or further obtain other photos and video related to the photographed object or information and knowledge about the object from such system. Obviously, such application is inconvenient.

In view of the foregoing shortcomings of the prior art, the inventor of the present invention based on years of experience to conduct extensive researches and experiments, and finally developed a data inquiry system, a data inquiry method and a data creating method for location-based image, video, and information in accordance with the present invention to overcome the shortcomings of the prior art.

SUMMARY OF THE INVENTION

The primary objective of the present invention is to provide a data inquiry system, a data inquiry method and a data creating method for location-based image, video, and information, particularly a technical area using space parameters and lens parameters to determine space coordinates of objects.

To achieve the foregoing objective, the present invention provides a data inquiry system for 3D location-based image, video, and information, comprising a client device and a remote server. The client device comprises a space module and a first transmission module. The space module is provided for retrieving space parameters pointed by the client device, and the space parameters are transmitted to a remote server through the first transmission module. The remote server comprises a database, a processing module and a second transmission module, and the database stores a plurality of object data and a plurality of related image and video data, and each object data at least comprises an object space position parameter, and the processing module obtains the space parameters through the second transmission module, and a space inquiry range is determined according to the space parameters. The space inquiry range is a conical range that uses the location of the client device as a vertex, and the processing module inquires and finds out objects of the object space position parameter in the space inquiry range, and shows the object in the image data of the client device, and displays the image data on the client device.

The client device further comprises a camera module if needed, for providing lens parameters. The space parameters and the lens parameters are transmitted by the first transmission module, and a space inquiry range is determined according to the space parameters and the lens parameters by the processing module. The remote server shows the inquired and finds objects and displays the object data on the client device.

Further, users can select an object displayed by the client device to further identify the object in order to retrieve the related information of the object from the database.

The related image data comprises a space description and an object index.

The present invention further provides a data inquiry method for 3D location-based image, video, and information, and the method comprises the steps of:

i. providing a plurality of object data, wherein each object data comprises an object space position parameter to describe the location of an object;

ii. using a space module for retrieving a space parameter pointed by the client device;

iii. determining a space inquiry range according to the space parameter, wherein the space inquiry range is a conical range using the location of the client device as a vertex;
iv. inquiring and finding out an object data of the object space position parameter situated in the space inquiry range; and
v. displaying the object data on the client device.

This method further comprises the step of selecting the object data displayed by the client device to obtain a related image data.

This method further comprises the steps of using a camera module to provide lens parameters, determining a space inquiry range according to the space parameters and the lens parameters, showing the inquired and found object data in the image data, and displaying the object data on the client device. The user can further identify the object shown on the client device for further retrieving the information of the object they are interested.

The data inquiry system and a data inquiry method for location-based image, video, and information in accordance with the present invention have the advantage of using a space parameter to determine the space coordinates of an object.

To make it easier for our examiner to understand the technical characteristics and effects of the present invention, we use a preferred embodiment accompanied with related drawings for the detailed description of the present invention as follows.

DETAILED DESCRIPTION OF THE PREFERRED EMBODIMENTS

The data inquiry system, the data inquiry method and a data creating method for location-based image, video, and information in accordance with the invention are described as follows. For simplicity, same numerals are used for same elements used in the following description.

Figure 1:
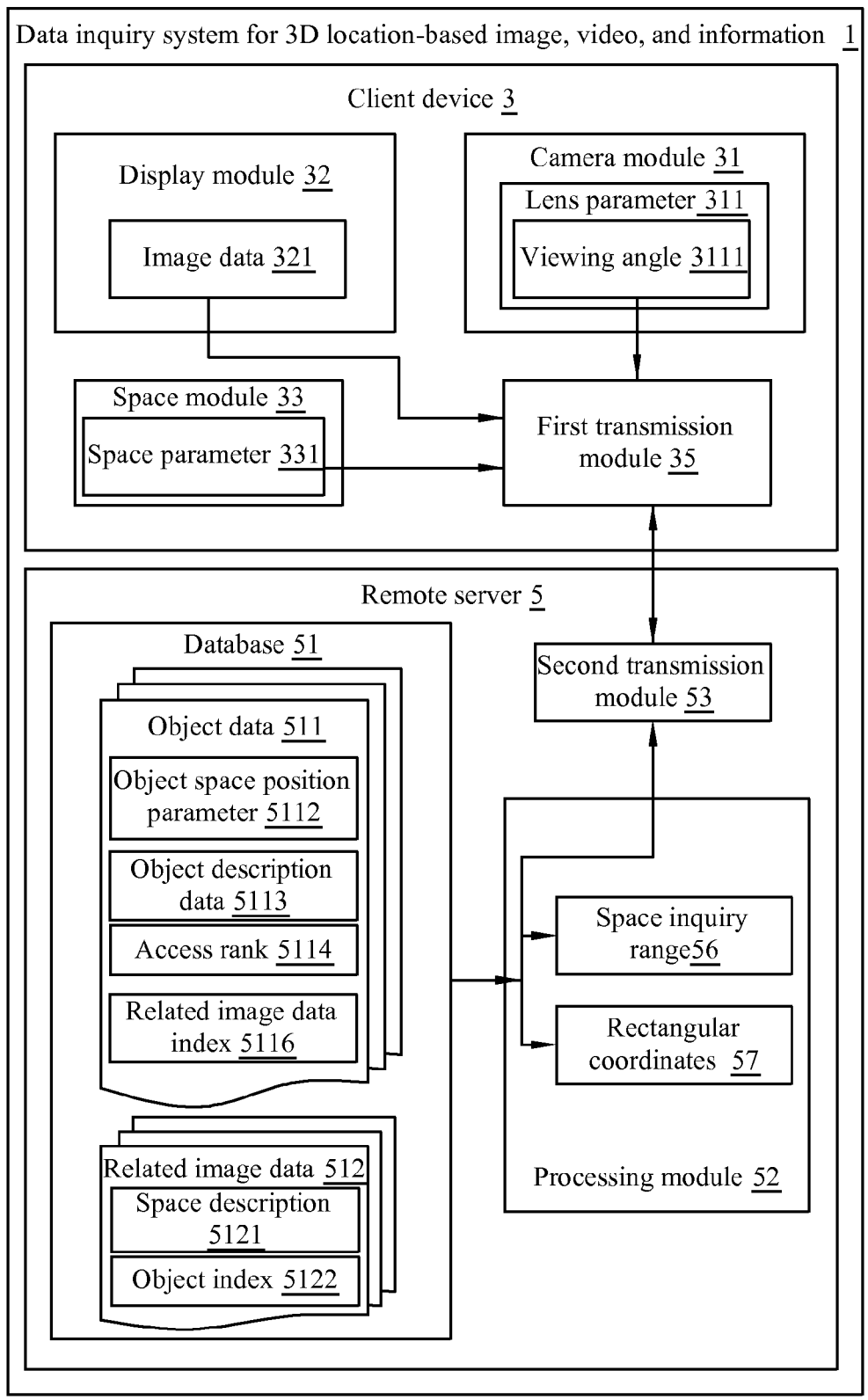
FIG. 1 is a functional block diagram of a data inquiry system for 3D location-based image, video, and information in accordance with a preferred embodiment of the present invention.
Figure 2A:
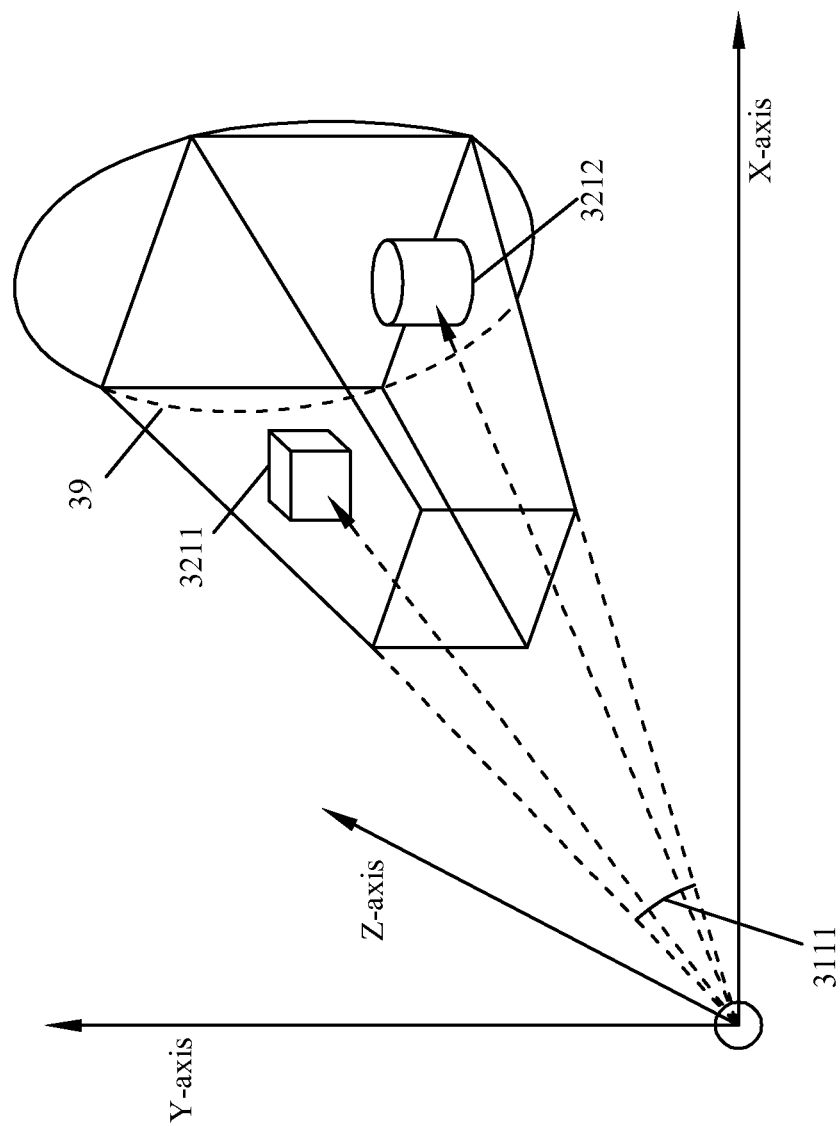
FIG. 2A is a schematic view of a data inquiry system for 3D location-based image, video, and information as depicted in FIG. 1.
Figure 2B:
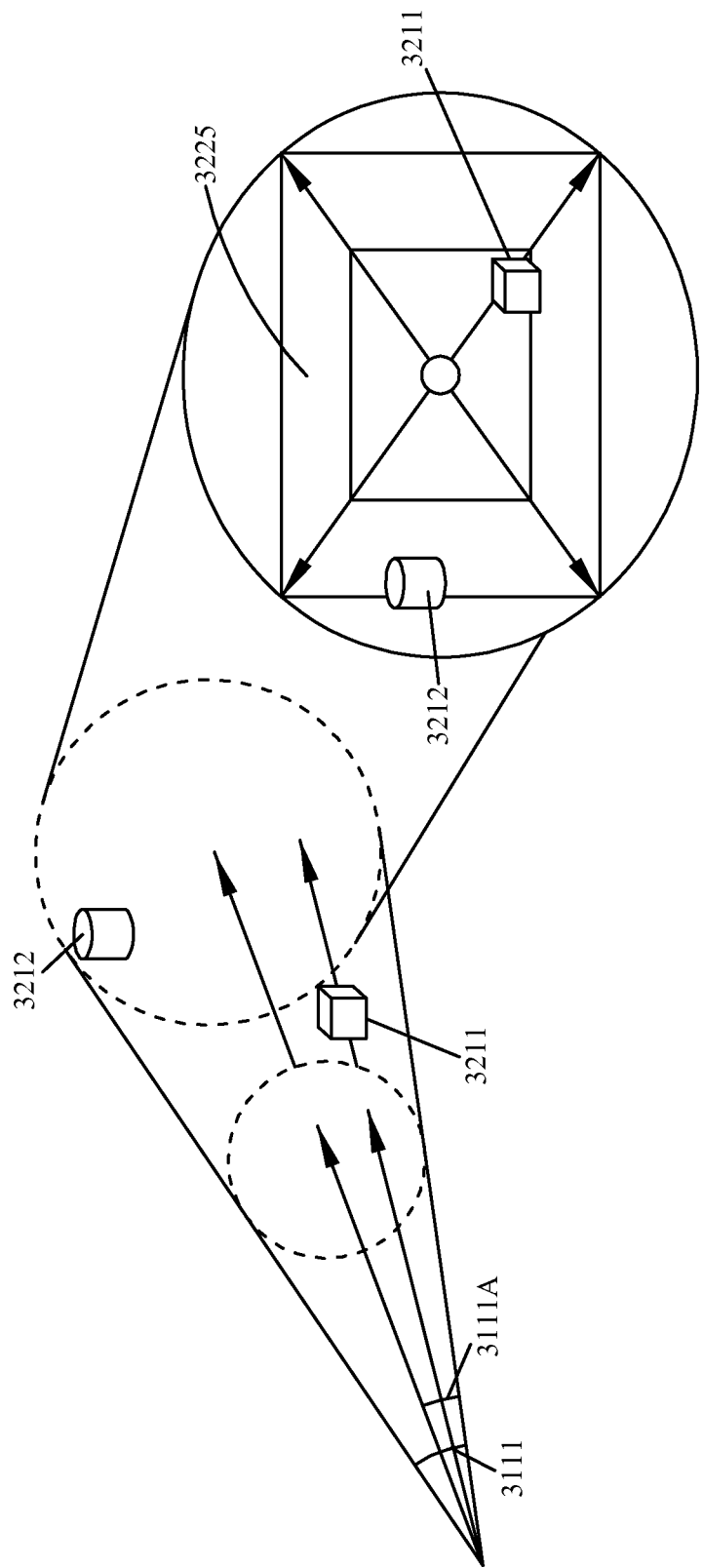
FIG. 2B is another schematic view of a data inquiry system for 3D location-based image, video, and information as depicted in FIG. 1.

Referring to FIGS. 1, 2A and 2B for a functional block diagram and schematic views of a data inquiry system for location-based image, video, and information in accordance with a preferred embodiment of the present invention respectively, the data inquiry system for location-based image, video, and information 1 as shown in FIG. 1 comprises a client device 3 and a remote server 5. The client device 3 comprises a camera module 31, a display module 32, a space module 33 and a first transmission module 35.

The space module 33 captures a space parameter 331 pointed by the client device 3. The space module preferably comprises a global positioning system (GPS), a direction sensor and an elevation angle sensor, wherein the global positioning system can provide a three-dimensional space coordinates, and the direction sensor can be a digital compass for providing a direction data, such as E60° N, and the elevation angle sensor can be a 3-axis accelerator or a gyroscope for providing an elevation angle data such as an elevation angle of 85°.

The display module 32 is used for displaying an image data 321. The image data 321 can be a static image or a video.

The camera module 31 is used for providing a lens parameter 311. The lens parameter 311 at least comprises a viewing angle 3111.

The client device 3 transmits the lens parameter 311 and the space parameter 331 to the remote server 5 through the first transmission module 35. The first transmission module 35 can be a wireless signal transmission module, such as a wireless area network module (WLAN), a personal communication system module such as GSM and 3G, a Bluetooth transmission module, a radio frequency transmission module or an infrared transmission module, or a cable transmission module such as a USB transmission module or an IEEE1394 module.

If a direction sensor or an elevation angle sensor is not available, the space module of this embodiment can simply comprise a global positioning system for providing at least one of the first space coordinates A(X1, Y1, Z1) and the second space coordinates B(X2, Y2, Z2) to obtain a direction data such as E60° N, and an elevation angle data such as an elevation of 85° in a three-dimension by the vector conversion (X2-X1, Y2-Y1, Z2-Z1) of the first space coordinates and the second space coordinates.

The remote server 5 comprises a database 51, a processing module 52 and a second transmission module 53, and the database 51 stores a plurality of object data 511, and each object data at least comprises an object space position parameter 5112, and also comprises related information, such as an object description data 5113, an access rank 5114 and a related image data index 5116, if needed for providing more functions to the inquiry system 1 such as a quick indexing of related image data of the object. The processing module 52 determines a space inquiry range 56 according to the space parameter 331 and the lens parameter 311 by using the location of the client device 3 as a vertex of the conical range. Referring to FIG. 1 for an inquiry system 1 in accordance with a preferred embodiment of the present invention, the inquiry system 1 comprises but not limited to a client device with or without a camera module, and the remote server can use the space parameter 331 to determine a space inquiry range 56. The processing module 52 inquires and finds out an object data 511 of an object space position parameter 5112 situated in the space inquiry range 56, and displays the object data 511 on the client device 1.

The remote server 5 can also store at least one related image data 512 linked with the related image data index 5116, and comprising a space description 5121 and an object index 5122 for creating and indexing the object data.

The client device 3 further comprises a read only memory (ROM), a dynamic access memory (RAM), a flash memory (FLASH) or a built-in memory (not shown only) of the camera module, wherein a plurality of object data 511 and a related image data 512 of the database 51 are partially or wholly cached into the memory of the client device 3.

Referring to FIG. 2A, the processing module 52 determines a conical space range 39 according to the space parameter 331 and the lens parameter 311 by using the client device 3 as an origin, and searches an object in the conical space range 39. We use the space direction of the image data 321 and the space direction of the object to determine whether or not the object 3211, 3212 falls within the conical space range 39, and the confirmation method can use the product of the vector inner product and cosine function of the included angle thereof for the confirmation as follows:

$$\cos\theta = \frac{\vec{A}\cdot\vec{B}}{|A|*|B|} \geq \cos\frac{\alpha}{2}$$

Where, A is a space vector of an image data, B is a space vector of an object, α is a viewing angle 3111, and θ is an included angle 3111A between the space vector of the object and the space vector of image data, and if "θ<α" stands for the object being in the conical space range 39 of the image data.

In FIG. 2B, the processing module 52 uses the viewing angle 3111 of the lens parameter 311 to make a 3D-to-2D conversion for a position vector produced by the object in the image data corresponding to the origin. To avoid too many objects shown in the image data, the remote server 5 will set a critical value such as an object access rank 5114. If the access rank 5114 is lower than the set critical value, then the displayed object will be filtered. For example, the critical value can be a magnitude of an object displayed in the image data through a 3D-to-2D conversion. If the magnitude of the object displayed in the image data is smaller than a critical value, then the object will be filtered. For example, the critical value can be a set area on the image data such as the area 3225, and the object in the unset area will be filtered.

Assumed that the objects 3211, 3212 meet the selection condition, the rectangular coordinates 57 of the object data situated in the image data 321 are calculated, and the second transmission module 53 will send the object description data 5113 and the rectangular coordinates 57 corresponding to the access rank 5114 to the client device 3 according to the level of the access rank 5114, and display them on the operating interface thereof. The second transmission module 53 can be a wireless signal transmission module, such as a wireless area network module (WLAN), a personal communication system module such as GSM and 3G, a Bluetooth transmission module, a radio frequency transmission module or an infrared transmission module, or a cable transmission module, such as a USB transmission module or an IEEE1394 module.

The client device further comprises an operating interface provided for users to browse a shown object data in the image.

Figure 3:
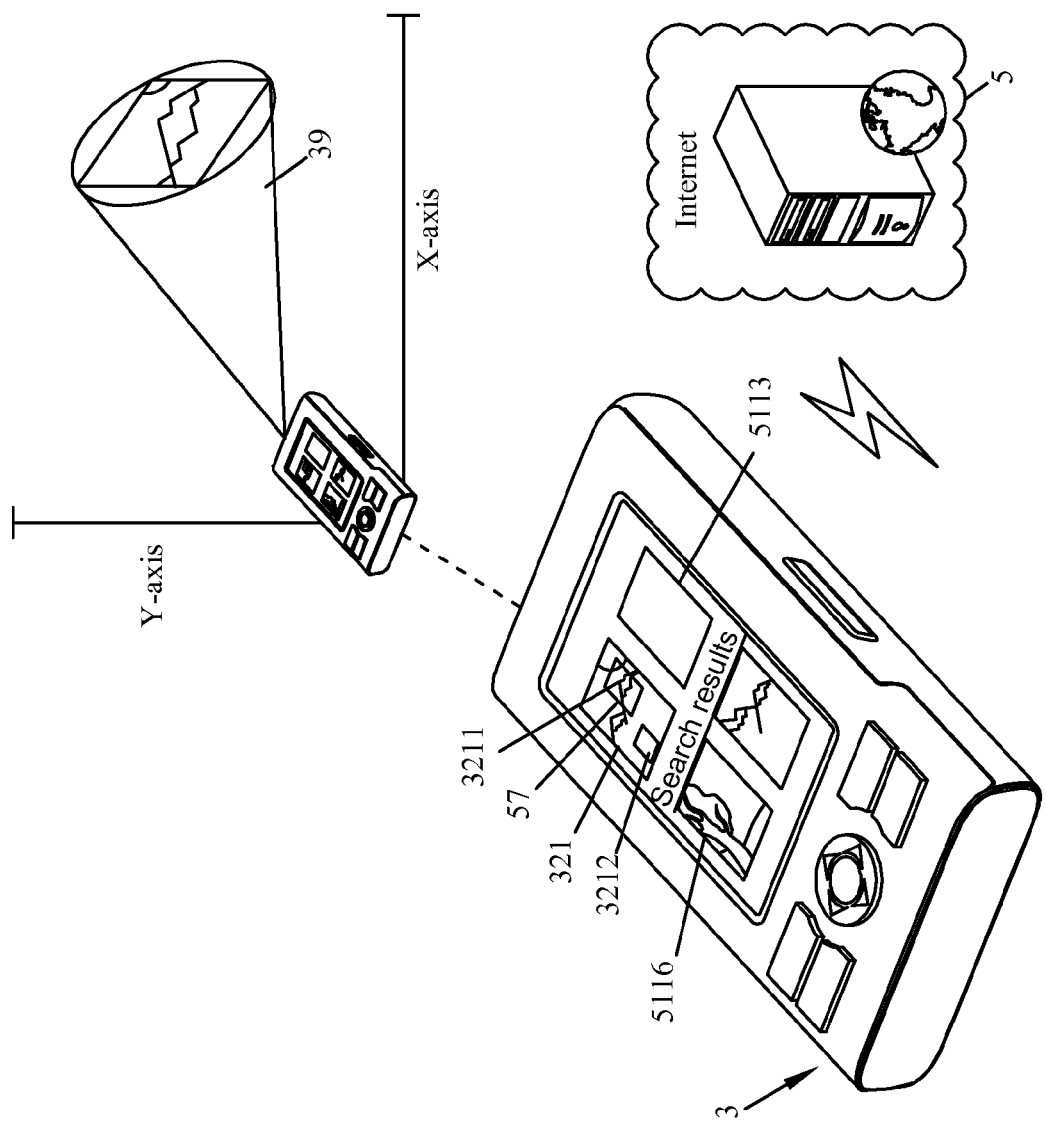
FIG. 3 is a schematic view of an application of a data inquiry system for 3D location-based image, video, and information in accordance with a preferred embodiment of the present invention.

Referring to FIG. 3 for a schematic view of an application of a data inquiry system for location-based image, video, and information in accordance with a preferred embodiment of the present invention, the client device 3 provides a lens parameter 311 and a space parameter 331 to send the lens parameter 311 and the space parameter 331 to the remote server 5, and determine a space inquiry range 56 according to the lens parameter 311 and the space parameter 331 by using the location of the client device 3 as the vertex of the conical range as shown in the conical space range 39 of FIG. 2, and then inquiring the object data of the object space position parameter in the space inquiry range, and finally displaying the object rectangular coordinates on the client device. After users select the desired observing object, the object description data 5113 and the related image data index 5116 are obtained.

Figure 4:
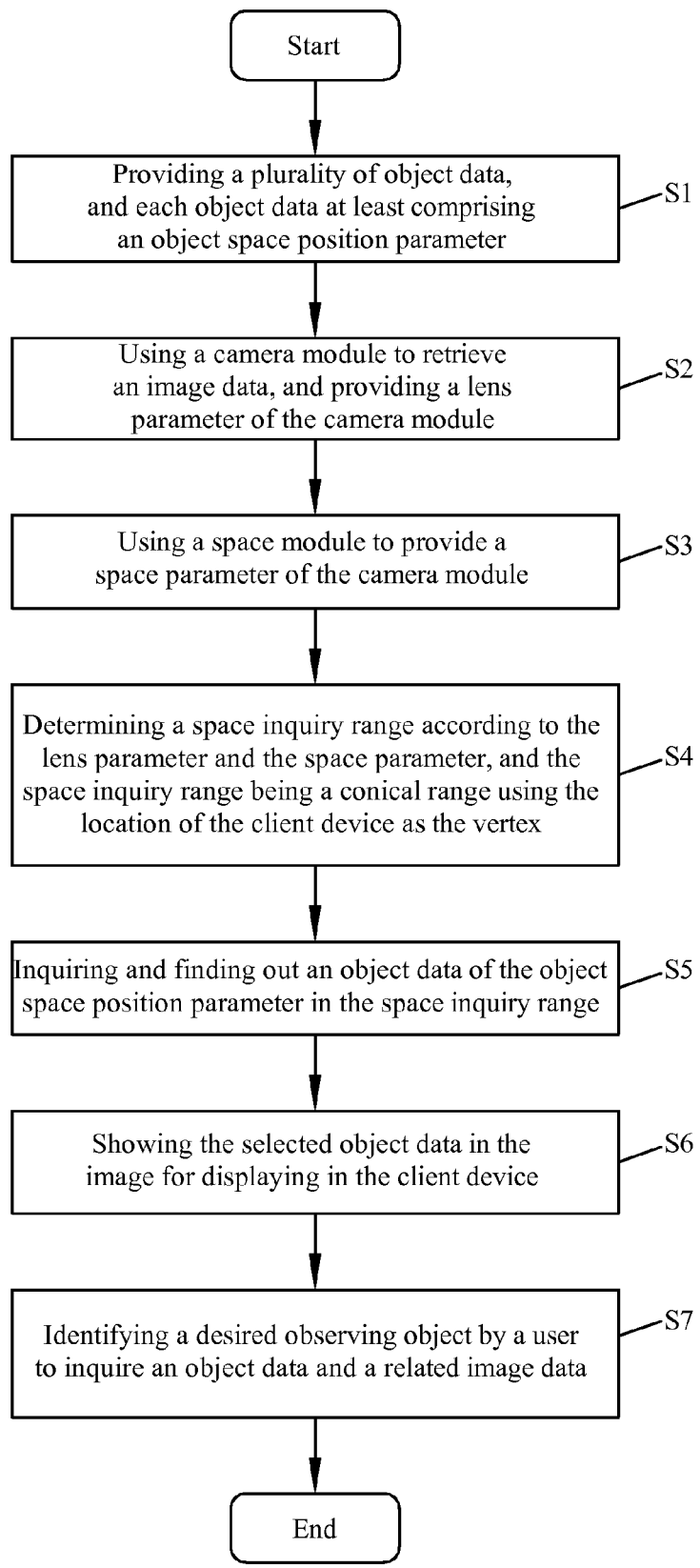
FIG. 4 is a flow chart of a data inquiry method for 3D location-based image, video, and information in accordance with a preferred embodiment of the present invention.

Referring to FIG. 4 for a flow chart of a data inquiry method for location-based image, video, and information in accordance with a preferred embodiment of the present invention, the method comprises the steps of:

Step S1: providing a plurality of object data, wherein each object data at least comprises an object space position parameter, and each object data further comprises an object description data, an access rank and a related image data index;

Step S2: using a camera module to retrieve an image data, and provide a lens parameter of the camera module, wherein the image data can be a static image or a video;

Step S3: using a space module to provide a space parameter of the camera module, wherein the space module preferably comprises a global positioning system (GPS), a direction sensor and an elevation angle sensor for detecting three-dimensional space coordinates, a direction data and an elevation angle data of the camera module respectively, but if the space module only comprises a GPS, then the GPS at a different location can be used for detecting the coordinates, and two coordinates are used to obtain a direction data;

Step S4: determining a space inquiry range according to the lens parameter and the space parameter, and the space inquiry range is a conical range using the location of the client device as the vertex as shown in the conical space range 39 of FIG. 2;

Step S5: Inquiring and finding out an object data of the object space position parameter in the space inquiry range;

Step S6: showing the selected object data in the image for displaying in the client device; and Step S7: identifying a desired observing object by a user to inquire an object data and a related image data.

From the description above, the invention estimates the space relation of an object in a photo, and uses the space parameters and the lens parameters to determine the space coordinates of the object. With such information, users can obtain the required information and knowledge by taking the picture. The invention can overcome the shortcomings of the prior art.

In summation of the above description, the present invention herein enhances the performance than the conventional structure and further complies with the patent application requirements and is thus duly filed for patent application. While the invention has been described by means of specific embodiments, numerous modifications and variations could be made thereto by those skilled in the art without departing from the scope and spirit of the invention set forth in the claims.

What is claimed is:

1. A data inquiry system for 3D location-based image, video, and information, comprising:
 a client device, having a space module and a first transmission module, and the space module being used for retrieving space parameters pointed by the client device, and the space parameters being transmitted by the first transmission module, wherein the space parameters are retrieved by only the space module itself; and
 a remote server, having a database, a processing module and a second transmission module, and the database being provided for storing a plurality of object data of a plurality of objects and a plurality of related image and video data, and each of the plurality of object data comprising an object space position parameter, and the processing module obtaining space parameters through the second transmission module, and determining a space inquiry range according to the space parameter, and the space inquiry range being a conical range that uses the location of the client device as a vertex, and the processing module inquiring and identifying an object data of the object space position parameter situated in the space inquiry range, filtering out a first part of the plurality of object data, which is smaller than a critical value, and displaying a second part of the plurality of object data, which is larger than the critical value, on the client device, wherein the second part of the plurality of object data, which is displayed by the client device, is used for enabling a user to identify an object from the second part of the plurality of object data and to further retrieve the image and video data related to the object, which is identified by the user, wherein the critical value is an access rank of each of the plurality of object data or a magnitude, which is displayed on the client device and corresponded to each of the plurality of object data, of each of the plurality of object data.

2. The inquiry system of claim 1, wherein the related image data comprises a space description and an object index.

3. The inquiry system of claim 1, wherein the space module comprises a global positioning system (GPS), a direction sensor and an elevation angle sensor.

4. The inquiry system of claim 3, wherein the elevation angle sensor comprises a 3-axis accelerator or a gyroscope.

5. The inquiry system of claim 3, wherein the direction sensor comprises a digital compass.

6. The inquiry system of claim 1, wherein the space module only comprises a global positioning system.

7. The inquiry system of claim 1, wherein the object space position parameter is a three dimensional coordinate.

8. The inquiry system of claim 1, wherein the object data further comprises an object description data, an access rank, and a related image data index.

9. The inquiry system of claim 1, wherein the first transmission module transmits data via a wired or a wireless transmission.

10. The inquiry system of claim 1, wherein the second transmission module transmits data via a wired or a wireless transmission.

11. The inquiry system of claim 1, wherein the client device further comprises a camera module for providing lens parameters, and the space parameters and the lens parameters are transmitted through the first transmission module, and the processing module determines the space inquiry range and the object according to the space parameters and the lens parameters, and shows the inquired object data in the image data displayed on the client device.

12. The inquiry system of claim 11, wherein the image data is a static image or a video.

13. The inquiry system of claim 11, wherein the plurality of object data and the plurality of the related image data stored in the database are partially or wholly cached into a memory of the client device.

14. A data inquiry method for location-based image, video, and information, comprising the steps of:
 (a) providing a plurality of object data of a plurality of objects, and each object data at least comprising an object space position parameter;
 (b) using a space module, for retrieving space parameters pointed by the client device, wherein the space parameters are retrieved by only the space module itself;
 (c) determining a space inquiry range according to the space parameters, wherein the space inquiry range is a conical range using the location of the client device as a vertex;
 (d) inquiring and identifying an object data of the object space position parameter situated in the space inquiry range;
 (e) filtering out a first part of the plurality of object data, which is smaller than a critical value, wherein the critical value is an access rank of each of the plurality of object data or a magnitude of an object, which is displayed on the client device and corresponded to each of the plurality of object data, of each of the plurality of object data; and
 (f) displaying a second part of the plurality of object data, which is larger than the critical value, on the client device for enabling a user to identify an object from the second part of the plurality of object data and to further retrieve the image and video data related to the object, which is identified by the user.

15. The data inquiry method of claim 14, wherein the space module comprises a global positioning system, a direction sensor and an elevation angle sensor.

16. The data inquiry method of claim 15, wherein the elevation angle sensor comprises a 3-axis accelerator or a gyroscope.

17. The data inquiry method of claim 15, wherein the direction sensor comprises a digital compass.

18. The data inquiry method of claim 15, wherein the space module comprises a global positioning system only.

19. The data inquiry method of claim 14, wherein the object space position parameter is a three-dimensional coordinate.

20. The data inquiry method of claim 14, wherein the client device further comprises an operating interface provided for a user to identify an object from a screen or an object menu.

21. The data inquiry method of claim 14, wherein the object data further comprises an object description data, an access rank and a related image data index.

22. The data inquiry method of claim 14, wherein the lens parameter comprises a viewing angle.

23. The data inquiry method of claim 14, further comprising the steps of:
 using a camera module to retrieve an image data, and provide lens parameters of the camera module;
 showing the potential objects on the image data;
 displaying the image data on the client device; and
 user identifying the object on the client device to further retrieve the information of the object.

24. The data inquiry method of claim 23, wherein the image data is a static image or a video.

* * * * *